United States Patent Office 3,702,359
Patented Nov. 7, 1972

3,702,359

CERTAIN MICROBIAL INSECTICIDES AND METHODS OF PREPARATION THEREOF

Howard T. Dulmage, Jose A. Correa, and Adelaido J. Martinez, Brownsville, Tex., assignors to the United States of America as represented by the Secretary of Agriculture Int. Cl. A01n 15/00

U.S. Cl. 424—93 3 Claims

ABSTRACT OF THE DISCLOSURE

Two biological insecticides and method of preparation thereof are disclosed. In the one method polyhedral inclusion bodies of the nuclear polyhedrosis virus of the cabbage looper, *Trichoplusia ni,* were precipitated from concentrated suspensions in 4–6% solutions of lactose upon addition of acetone. Alternate steps to the method of preparation are also provided. A dry resuspendable product (in water) is obtained.

In the second method, the spore-crystalline toxin complex of *Bacillus thuringiensis* was precipitated from concentrates derived from fermentation beers resuspended in 4–6% lactose upon addition of acetone. A dry powder containing the crystalline toxin live spore complex is thus provided.

A non-exclusive, irrevocable, royalty-free license in the invention herein described throughout the world for all purposes of the United States Government, with the power to grant sublicenses for such purposes, is hereby granted to the Government of the United States of America.

This invention relates to biological insecticides. Specifically, this invention relates to a biological insecticide containing a bacteria, a biological insecticide containing a virus, and to the method of preparation of these insecticides. More specifically, this invention relates to biological insecticides of *Bacillus thuringiensis* and of *Trichoplusia ni,* and to a method of preparation of the insecticide in the form of a dry, stable powder containing the crystalline toxin-spore complex of *Bacillus thuringiensis,* as well as to a method of preparation of the insecticide in the form of a dry powder containing the live nuclear polyhedrosis virus of *Trichoplusia ni,* supplemented by an alternate set of steps for the latter method.

The main object of this invention is to provide stable water-dispersible biological insecticides of *Trichoplusia ni* virus and of *Bacillus thuringiensis* bacteria.

A second object of the instant invention is to provide methods of preparing these insecticides in a form which can be readily dispersible from an aqueous medium.

It is well known that insects can be attacked by a multitude of pathogenic organisms about 250 viruses, 80 bacteria, 460 fungi, and 20 rickettsial diseases are known which can be encouraged through mass culture and release. A number of these are adaptable for mechanical dissemination as microbial insecticides to inoculate insect populations, soils, fields, or forests with spores, microbial toxins, or viral suspensions. An example of one of the most successful applications of this technique is the way of spores of *Bacillus popillae,* produced from infected larvae of the Japanese beetle, diluted in talc as a standardized powder containing 100 million spores per gram. This is applied to the soil in patches at about 2–20 lb./acre resulting in the slow spread of the disease and very satisfactory control of the beetle larvae within three years.

Microbial insecticides have the advantage of a high degree of specificity to insects, the general harmless nature of inesct pathogens for mammals, and the possible permanent colonization of the infection. Disadvantages include difficulties in production and standardization of the product, lack of broad-spectrum effectiveness where needed, instability of the insecticide, and frequent dependence upon suitable climatic conditions, and precise timing of the application for maximum infectivity.

*Bacillus thuringiensis*

Prior art: Previous commercial procedures, such as production of the complex on moist bran media and drying the final bran (Mechalas, U.S. Pat. No. 3,076,922) or the recovery processes reported in the Megna (U.S. Pat. No. 3,073,749) or Drake and Smythe (U.S. Pat. No. 3,087,865) patents have either been costly or unsuitable in other ways for production of easily suspendable, stable, dry preparations, so that they have not enjoyed widespread use.

Several procedures have been reported for the purification of the spore-crystal complex of *Bacillus thuringiensis,* all designed to produce highly purified materials. These procedures were reported by Angus, "Separation of Bacterial Spores and Parasporal Bodies With a Fluorocarbon," J. Insect Pathol., vol. 1, pp. 97–98 (1959); Bateson, "Isolation of the Crystalline Parasporal Bodies of *Bacillus thuringiensis,*" Nature, vol. 205, pp. 622–623 (1965); Delafield et al., "Immunological Homology Between Crystal and Spore Protein of *Bacillus thuringiensis,*" J. Bacteriology, vol. 96, pp. 713–720 (1968); Gingrich, "A Flotation Procedure for Producing Spore-Free Crystals From Commercial Formulations of *Bacillus thuringiensis* var. *thuringiensis,*" J. Invertebr. Pathol., vol. 10, pp. 180–184 (1968); Lacadet, "La Toxine Figure de *Bacillus thuringiensis,* Technique de Separation et Composition en Acides Amines," Compt. Rend. Acad. Sci. Paris, vol. 261, pp. 5693–5696 (1965); Murray et al., "A Simplified Purification Technique for Parasporal Inclusions from Certain Varieties of *Bacillus thuringiensis,*" J. Invertebr. Pathol., vol. 8, pp. 418–420 (1966); and Robertson et al., "Crystal Preparations From Commercial *Bacillus thuringiensis* var. *sotto* Concentrates," J. Insect Pathol., vol. 4, pp. 273–274 (1962). The primary method of obtaining dry and stable, but crude, concentrates of the spore-crystal complex in the laboratory has been freeze drying, but significant losses of spores and cells have frequently resulted and considerable clumping of spores and crystals have occurred. A more satisfactory method of obtaining lyophilized materials involves freeze-drying lactose suspensions of the complex—a procedure used for many years by microbiologists—partly to reduce clumping and partly to protect the biologic material. However, freeze-drying is not adapted to the routine handling of a wide variety of fermentation beers. Also, the large volumes of liquids involved make any drying procedure both difficult and costly, whether the beers are taken from shake flasks or from deep-tank fermentors.

Acetone, a protein precipitant used to precipitate bacterial cells and spores from aqueous concentrates, was a possible substitute. However, the product was often clumped and difficult to resuspend. In accordance with one feature of this invention the procedure of acetone precipitation was modified to make it suitable for the recovery of the spore-crystal complex of *B. thuringiensis.*

Results and discussion: In one method of this invention *B. thuringiensis* var.-*alesti* was grown to determine what effect the recovery process had on the ratio of spores and crystals and the recovery was checked both by counting the spores and by comparison of the $DDU_{50}$ values. "$DDU_{50}$" is the reciprocal of "$LD_{50}$." When this term is used the total diet dilution units can be directly compared whatever the original ratio (units/ml., units/g., etc.)

happen to have been. Table III gives the results. The ratios varied from beer to beer from a low of 60 to a high of 400 $DDU_{50}/10^7$ spores, and these ratios were not changed in the corresponding preparation. Thus, coprecipitation with lactose did not affect the ratio of spores and crystals.

The procedure was also applied to beers of known serotypes of *B. thuringiensis* to determine whether coprecipitation could be used with other variants. Most of these organisms were grown on medium B (Table I), but five were also grown on medium A. The results are given in Table V and are based on spore counts only. The percentage yields varied no more widely than the percentages from repeated recoveries from a single culture, and there was no association between high or low yields due to the microbial variant or the medium. Thus, the process of coprecipitation could apparently be used safely with any of the isolates of *B. thuringiensis* tested.

Any difference in the quality of the products derived from coprecipitations from different concentrations of lactose was investigated by making a series of preparations and using levels of 4, 5 and 6% lactose in the precipitation. The recoveries were all made from 2300 ml. of harvested beer, and all beer samples were produced by growing the *alesti* variant in medium A for 72 hours. The results are shown in Table IV. The weight of the end products from 5% lactose suspensions increased unexpectedly over that from the 4% lactose suspensions. Although the total amount of lactose in the solution was increased only 2 g., the inert materials in the average end product increased 6 g. Apparently, the solubilities of other materials in the suspension were changed by increasing the concentration of lactose. The change in weight in the product between recoveries from 5 and 6% lactose suspensions was the expected 2 g.

In addition, a subjective improvement occurred in the end products when the higher levels of lactose were used: Those derived from the 5 and 6% lactose suspensions filtered faster and resuspended more readily in water. These subjective observations were reproducible, and 5% lactose solutions are now used as standard procedure.

All preparations of the spore-crystal complex derived from these procedures were kept at room temperature to determine their stability at such conditions. One material assayed repeatedly over 11 months lost no spore or insecticidal activity. Also, 30–40 materials assayed over 2–10 months showed no loss in either spore or insecticidal activity. Such a result is characteristic of dry preparations of *B. thuringiensis* and indicates that the coprecipitation did nothing to weaken this stability.

Fermentations: Variants of *B. thuringiensis* were grown on nutrient agar slants. Loopsful of bacterial growth from these slants were used to inoculate 500 ml. Erylenmeyer seed flasks containing 100 ml. tryptose-phosphate broth that had been autoclaved at 121° C. for 35 minutes. The flasks were incubated on a rotary shaker at 280 r.p.m. and 32° C. for 24 hours and 3% by volume of these first passage seeds were then used to inoculate second similar seed flasks that were incubated 18–24 hours as before.

The composition of the fermentation media used were not selected as the best for the growth of these organisms but as two different but representative media that would reasonably support the fermentation of the *B. thuringiensis* variants. The run media were distributed at the rate of 125 ml./500 ml. Erlenmeyer flask, autoclaved at 121° C. for 35 minutes, and then inoculated with 2% by volume of the second passage seed. The flasks were then incubated at 280 r.p.m. and 32° C. on a rotary shaker and harvested when sporulation and cell lysis were essentially complete, generally between 72 and 96 hours later when the pH of the beer approached 8.5.

Recovery process: The crystalline toxin is known to be sensitive to alkaline pH, so we adjusted the beer to pH 7.0 with 1 N HCl before centrifuging. The beer samples were centrifuged in a refrigerated centrifuge. Large batches were spun at 3500 r.p.m. for 20 minutes or at 10,000 r.p.m. with a continuous flow system equipped with a special head. Small batches were centrifuged for 15 minutes at 10,000 r.p.m. The supernatant fluid which contained less than 1% of the spores and crystals was discarded, and the thick, creamy residue was resuspended in a small amount of a 4–6% lactose solution and diluted with additional lactose solution until the final volume was between one-tenth and one-twentieth that of the original beer. Then the mixture was stirred 15–30 minutes to obtain even distribution of the suspended cream, 4 vol. of acetone were added gradually to each volume of the suspension while the stirring was continued, and the resulting aqueous acetone suspension was stirred an additional 30 minutes and filtred with suction in a Buchner funnel. If the suspension was transferred immediately to the Buchner funnel for filtration, the filtering process was rather slow, but if it was first allowed to settle for about 10 minutes, the filtration was rapid. The acetone precipitate was now washed twice by stirring it with a small amount of acetone and dried overnight, either in a vacuum dessicator or in the air at room temperature. No difference was observed in the product obtained from the two methods of drying.

Measurement of spore counts: The number of viable spores was determined by plating samples in tryptose-phosphate agar after pasteurization for 10 minutes at 65° C. The three plates used for each dilution were incubated 36–48 hours at 30–32° C. Since microscopic examination of the beer and preparations indicated that clumping was minimal, saponification was not usually necessary in preparing the samples.

Bioassay: First-instar larvae of the tobacco budworms, *Heliothis virescens*, growth individually in 1-oz. clear plastic cups on a semisynthetic diet similar to those developed by Vanderzant et al. ("The Role of Ascorbic Acid in the Nutrition of Three Cotton Insects," J. Insect Physiol., vol. 8, pp. 287–297 (1962)), Vanderzant and Richardson ("Ascorbic Acid in the Nutrition of Plant Feeding Insects," Science, vol. 140, pp. 989–991 (1963)), and Berger ("Laboratory Technique for Rearing Heliothis Species on Artificial Medium," U.S. Dept. of Agriculture, ARS Bulletin 33–84 (1963)), were used to bioassay the spore-crystal complex. The diet was prepared so that the final temperature would be 50±2° C., and it was held at that temperature until used. Samples of the preparations of *B. thuringiensis* that were to be tested were incorporated into the diet with a blender (1 part preparation to 50 parts diet). A minimum of five, and usually six, dilutions of each sample was assayed with 50 larvae used for each dilution. Each dilution was one-half the preceding one. Either 100 or 200 larvae were used as controls depending on the size of the assay. All larvae were incubated at 30±1° C. Since the larvae frequently took a long time to succumb to the preparations of Bacillus the test period was 14 days. By this time, most check larvae were either in the prepupal or the pupal stage. The percentage dead for each dilution was recorded at the end of the test and the $LD_{50}$ for each sample was determined by plotting hand-fitted dose-response curves onto log-probability paper.

The cabbage looper, *Trichoplusia ni*

Prior art: Several methods for rearing and infecting larvae to produce the nuclear polyhedrosis virus of the cabbage looper, *Trichoplusia ni*, have been proposed. See, for example, Getzin, "Mass Rearing of Virus-Free Cabbage Loopers on an Artificial Diet," J. Insect Pathol., vol. 4, pp. 486–488 (1962); Ignoffo, "A Successful Technique for Mass Rearing Cabbage Loopers on a Semisynthetic Diet," Ann. Entomol. Soc. Amer., vol. 46, pp. 178–182 (1963); and Ignoffo, "Production and Virulence of a Nuclear-Polyhedrosis Virus From Larvae of *Trichoplusia ni* (Hüzner) Reared on a Semisynthetic Diet," J. Insect Pathol., vol. 6, pp. 318–326 (1964a). However, little effort has been made to improve the recovery of the virus from diseased larvae. The frozen suspensions prepared from macerated larvae that were used in many early studies are impractical for any large-scale investigations. Subsequently, Ignoffo (1964a) prepared freeze-dried material from a lactose paste and obtained powders that were satisfactory and stable for prolonged periods if they were refrigerated. Dulmage et al. ("Coprecipitation With Lactose as a Means of Recovering the Spore-Crystal Complex of *Bacillus thuringiensis*," J. Inverterbr. Pathol., vol. 15, pp. 15-20 (1970a); and "Recovery of the Nuclear Polyhedrosis Virus of the Cabbage Looper, *Trichoplusia ni* by Coprecipitation With Lactose," J. Invertebr. Pathol., vol. 16, pp. 80-83 (1970b)) recovered dry preparations of the spore-crystal complex of *Bacillus thuringiensis* by precipitation with acetone from lactose suspensions and found that the lactose precipitated with the complex and helped prevent clumping of the spores and crystals. Another feature of this invention relates to the application of the same procedure to the recovery of the cabbage looper virus.

Disucssion: Four fresh preparations of cabbage looper inclusion bodies prepared in a similar manner over a period of 2 months had average counts of 63, 63, 64, and 69 PIB/g. Thus, the preparations were very uniform and there seemed to be less clumping of the polyhedral bodies in these preparations than in the lyophilized stock when the materials were examined microscopically. All preparations resuspended easily in water.

Polyhedra could be recovered by both methods of coprecipitation with little difficulty. When centrifugation was omitted, 5000 diseased larvae could be reduced to the final product in 2 hours with laboratory-scale equipment. Yields which were over 80%, were satisfactory. The stability of both preparations was comparable to that of the usual lyophilized materials.

The foregoing indicates that the nuclear polyhedrosis virus of the cabbage looper can be satisfactorily recovered by either of two methods of coprecipitation and that the products can be useful replacements for the usual lyophilized material. The purity of product desired would dictate the choice of method.

Details of the work that led to the method of this invention can be found in volumes 15 and 16 (January 1970 and July 1970) of the Journal of Invertebrate Pathology by Dulmage, Correa, and Martinez.

Recovery of virus: Table V is a flow sheet showing two processes of recovery which differ only in the initial treatment of the polyhedral suspension. To compare the yields of virus obtained by the two methods, 3700 ml. of a larval extract were prepared by blending about 4500 infected larvae in a blender with water and filtering the blend through fine nylon to remove body parts. The resulting suspension was then divided into two unequal portions and virus was recovered by each process.

One portion (1500 ml.) was centrifuged at 10,000 r.p.m. for 30 minutes in a refrigerated centrifuge. The supernatant fluid was discarded, and the residue was suspended in 700 ml. of a 6% solution of lactose, followed by the addition of 2800 ml. acetone-precipitated PIB, lactose, and undefined impurities. The final product weighed 60 g. and contained $150 \times 10^9$ PIB/g.—a yield of 82%, based on counts of polyhedra.

For the second method, 135 g. of lactose was dissolved in the second portion (2200 ml.) to obtain a suspension containing 6% lactose. The addition of 8800 ml. of acetone then precipitated a mixture of lactose, PIB, and impurities weighing 199 g. The extra weight was caused by greater amounts of impurities. Counts of this material showed $63 \times 10^9$ PIB/g., a yield of 81% (Table VI). The second procedure, therefore, produced a preparation with lower purity; but considerable time was saved by omitting the centrifugation. This method was therefore adopted as standard in all of the work.

Bioassay of products: Fresh preparations recovered by the two methods described were compared with the original inoculum by incorporating each material into 200 cups of artificial diet at a concentration of $1 \times 10^6$ PIB/ml., the level reported by Ignoffo ("Bioassay Technique and Pathogenicity of a Nuclear-Polyhedrosis Virus of the Cabbage Looper *Trichoplusia ni* (Hübner)," J. Insect. Pathol., vol. 6, pp. 237-245 (1964)), to produce 90% mortality of the cabbage looper. Then the cups were infested with one 7-day-old third-instar cabbage looper each and incubated for 7 days. Better than 90% kill of loopers was always obtained. Also, the coprecipitated polyhedra obtained without centrifugation was bioassayed after 9 months of storage at 4° C. and compared with the original lyophilized stock. A series of dilutions of this preparation and the stock were incorporated into artificial diet (50 cups of each), infested with one 7-day-old cabbage looper/cup, and incubated for 7 days. Percentage kill of each dilution (replicated three times) was determined, and the $LD_{80}$ was determined by plotting dose-response curves onto log-probability paper. The average $LD_{80}$ for the coprecipitated material was $9 \times 10^4$ PIB/ml. and that for the original inoculum was $10 \times 10^4$ PIB/ml. Thus, no difference was observed in the toxicities of the two materials.

TABLE I

Composition of media used in the fermentation of *Bacillus thuringiensis*

| Medium A (ingredient): | Weight (g.) |
|---|---|
| Tryptose | 10.0 |
| Dextrose | 5.0 |
| Starch | 5.0 |
| Yeast extract | 2.0 |
| $K_2HPO_4$ | 1.0 |
| $KH_2PO_4$ | 1.0 |
| Distill $H_2O$ to 1000 ml. | |

| Medium B (ingredient): | Weight (g.) |
|---|---|
| Proflo [a] | 10.0 |
| Peptone | 2.0 |
| Dextrose | 15.0 |
| Yeast extract | 2.0 |
| $MgSO_4 \cdot 7H_2O$ | 0.3 |
| $FeSO_4 \cdot 7H_2O$ | 0.02 |
| $ZnSO_4 \cdot 7H_2O$ | 0.02 |
| $CaCO_3$ | 1.0 |
| Distill $H_2O$ to 1000 ml. | |

[a] A partially defatted cooked cotton seed flour.

TABLE II

Spore and insecticidal compositions of beer (produced by *Bacillus thuringiensis* var. *alesti*) and the derived preparations [a]

| Test No. | Beer assays | | | Preparation assays | | |
|---|---|---|---|---|---|---|
| | Spore count ($\times 10^7$/ml.) | $DDU_{50}$/ml. | Ratio of $DDU_{50}/10^7$ spores | Spore count ($\times 10^7$/g.) | $DDU_{50}$/g. | Ratio of $DDU_{50}/10^7$ spores |
| 55 | 15 | 900 | 60 | 1,400 | 91,000 | 65 |
| 56 | 25 | 10,000 | 400 | 1,600 | 670,000 | 420 |
| 57 | 22 | 3,500 | 160 | 1,800 | 220,000 | 120 |
| 58 | 17 | 4,500 | 260 | 2,000 | 500,000 | 250 |
| 59 | 21 | 3,500 | 170 | 1,600 | 380,000 | 230 |
| Average | 20 | 4,500 | 230 | 1,700 | 370,000 | 220 |

[a] Medium A (see Table I).

TABLE III

Recovery of spores of *Bacillus thuringiensis* from fermentation beer co-precipitated with 4% lactose

| | | Total spores (×10^10) | | |
|---|---|---|---|---|
| | Medium | Harvested beer | Final preparation | Percent yield |
| Variant of *B thuringiensis*: | | | | |
| alesti | A | 7.8 | 5.7 | 73 |
| | B | 12.0 | 5.5 | 46 |
| dendrolimus | A | 25.0 | 15.0 | 60 |
| | B | 190.0 | 120.0 | 63 |
| finitimus | B | 55.0 | 23.0 | 42 |
| galleriae | A | 11.0 | 7.1 | 65 |
| | B | 68.0 | 51.0 | 75 |
| kenyae | B | 59.0 | 31.0 | 53 |
| sotto | B | 4.6 | 3.1 | 67 |
| subtoxicus | B | 90.0 | 43.0 | 48 |
| thuringiensis | A | 23.0 | 9.6 | 42 |
| | B | 300.0 | 230.0 | 77 |
| tolworth | A | 12.0 | 4.1 | 34 |
| | B | 80.0 | 60.0 | 75 |
| Average | | 64.0 | 43.0 | 67 |

TABLE IV

Yields from harvested beers ᵃ co-precipitated with varying concentrations of lactose

| Percentage lactose used in precipitation | Average yield (g.) | Average $DDU_{50}$/g. | Average total $DDU_{50}$ values |
|---|---|---|---|
| 4 | 9.0 | 1,300,000 | 11,700,000 |
| 5 | 15.0 | 830,000 | 12,500,000 |
| 6 | 17.0 | 450,000 | 7,700,000 |

ᵃ Medium A (see Table I). Culture *B. thuringiensis* var. *alesti*.

TABLE V

Flow sheet: recovery processes for nuclear polyhedra of *Trichoplusia ni*

```
                    Diseased larvae
                          |
            Extract with about 0.8 ml H₂O/larva
                          |
                 Filter through fine cloth
                 /                        \
          METHOD A                        METHOD B
             |                         Add 6 g. lactose/100 ml. extract
          Centrifuge                         |
           /    \                        Stir 30 min.
      Residue   Supernatant
         |      (discard)
      Suspend in ⅓ vol.
         |
      6% lactose
         |
      Stir 30 min.
                 \                        /
                    BOTH METHODS
                          |
                  Add slowly while stirring
                       4 vol. acetone
                          |
                     Stir 30 min.
                          |
                    Let stand 10 min.
                          |
                    Filter with suction
                    /              \
         Filtrate (discard)      Residue
                                    |
                        Stir with small volume acetone
                                    |
                            Filter with suction
                           /              \
                Filtrate (discard)      Residue
                                           |
                               Stir with small volume acetone
                                           |
                                   Filter with suction
                                  /              \
                       Filtrate (discard)      Residue
                                                  |
                                           Dry overnight
```

TABLE VI

Comparison of yield of polyhedra from two methods of coprecipitation

| | Procedure | |
|---|---|---|
| Measurement | Centrifuge included | Centrifuge omitted |
| Volume initial suspension, ml | 1,500 | 2,200 |
| Initial concentration of virus | 7.1×10⁹ PIB/ml. | 7.2×10⁹ PIB/ml. |
| Total virus in initial suspension | 110×10¹¹ PIB | 160×10¹¹ PIB |
| Initial conc. solids, percent | 6.8 | 6.8 |
| Total solids, g | 102 | 150 |
| Lactose added, g | 42 | 135 |
| Corrected total solids, g | 144 | 285 |
| Weight final preparations, g | 60 | 199 |
| Virus concentration | 150×10⁹/g. | 63×10⁹/g. |
| Total virus, final preparation | 90×10¹¹ PIB | 130×10¹¹ PIB |
| Percentage yield, PIB | 82 | 81 |
| Percentage yield, solids | 42 | 70 |

We claim:

1. A method of preparing a biological insecticide comprising:
   (a) preparing a beer infected with crystalline toxin-spore complex of *Bacillus thuringiensis*;
   (b) adjusting the pH of the whole beer to about 7.0;
   (c) centrifuging the beer in a refrigerated centrifuge at about from 3500 to 10,000 r.p.m. to produce a supernatant fluid and a thick, creamy residue;
   (d) discarding the supernatant fluid and resuspending the thick, creamy residue in a small amount of 4–6% lactose solution;
   (e) further diluting the thick, creamy residue with said lactose solution until a final concentration of about 1/10 to 1/20 with respect to the original beer is attained, while stirring to obtain a homogenous mixture;
   (f) adding, with continuous stirring, four volumes of acetone for each volume of lactose suspension;
   (g) filtering said suspension under vacuum and discarding the filtrate;
   (h) washing the residue with acetone; and
   (i) drying the washed residue to obtain a dry powder containing the live, crystalline toxin-spore complex of *Bacillus thuringiensis*.

2. A method of preparing a biological insecticide, comprising:
   (a) blending larvae of the cabbage looper *Trichoplusia ni* infected with nuclear polyhedrosis virus in a mixture of 1 larva for each milliliter of water required,
   (b) filtering the blended mixture,
   (c) adding lactose to the blended mixture to reach a concentration of about 6% lactose,
   (d) adding four volumes of acetone to each volume of the lactose suspension, while stirring continuously,
   (e) filtering the dilute suspension under vacuum and discarding the filtrate,
   (f) washing the precipitate with acetone, and
   (g) drying the biological insecticide thus produced until a dry powder containing the live nuclear polyhedrosis virus of *Trichoplusia ni* is obtained.

3. A method of preparing a biological insecticide, comprising:
   (a) blending larvae of the cabbage looper *Trichoplusia ni* infected with nuclear polyhedrosis virus in a mixture of 1 larvae for each milliliter of water required,
   (b) filtering the blended mixture,
   (c) centrifuging the filtered blend so as to recover polyhedra in the suspension as a crude creamy residue,
   (d) resuspending the crude cream in an aqueous solution of about 6% lactose and stirring the mixture to obtain a homogenous mixture, (e) adding four volumes of acetone to each volume of the lactose suspension, while stirring continuously,
(f) filtering the dilute suspension under vacuum and discarding the filtrate,
(g) washing the precipitate with acetone, and
(h) drying the biological insecticide thus produced until a dry powder containing the live nuclear polyhedrosis virus of *Trichoplusia ni* is obtained.

References Cited

Steinhaus: Insect Pathology, vol. 2, published by Academic Press, New York, 1963, pp. 523 and 531.

Ignoffo: Journal of Insect Pathology, vol. 6, 318–326, 1964.

RICHARD L. HUFF, Primary Examiner